No. 739,270. PATENTED SEPT. 15, 1903.
W. F. WAGNER.
VEGETABLE OR MEAT CUTTER.
APPLICATION FILED SEPT. 27, 1901.
NO MODEL. 2 SHEETS—SHEET 2.
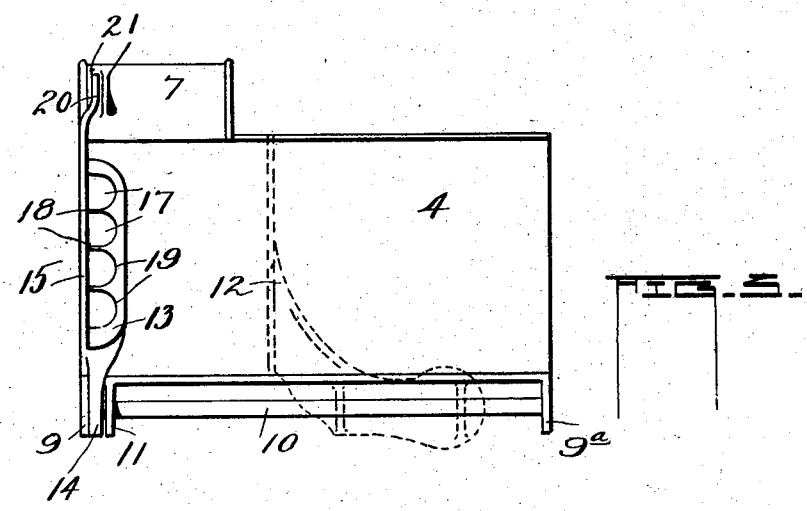
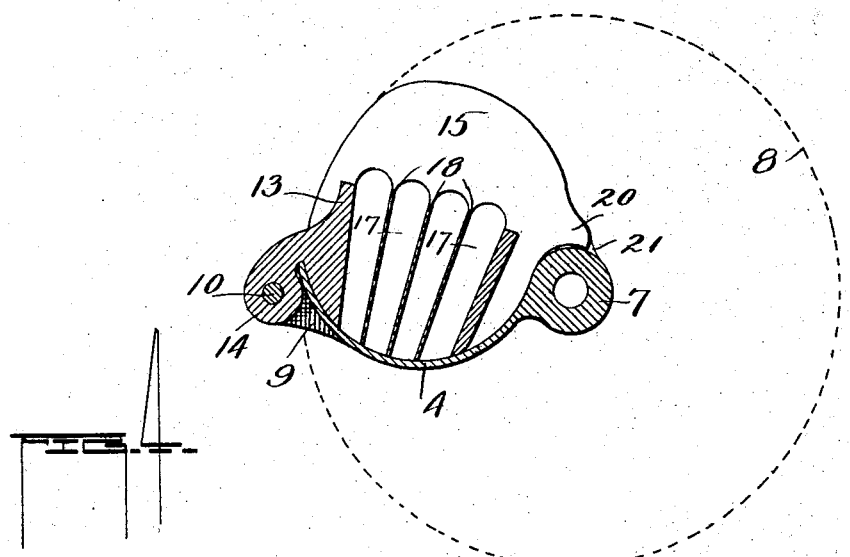
Witnesses:
J. E. Strawn
Gus Huntson
Inventor,
William F. Wagner
By Chas. H. LaPorte
Atty.

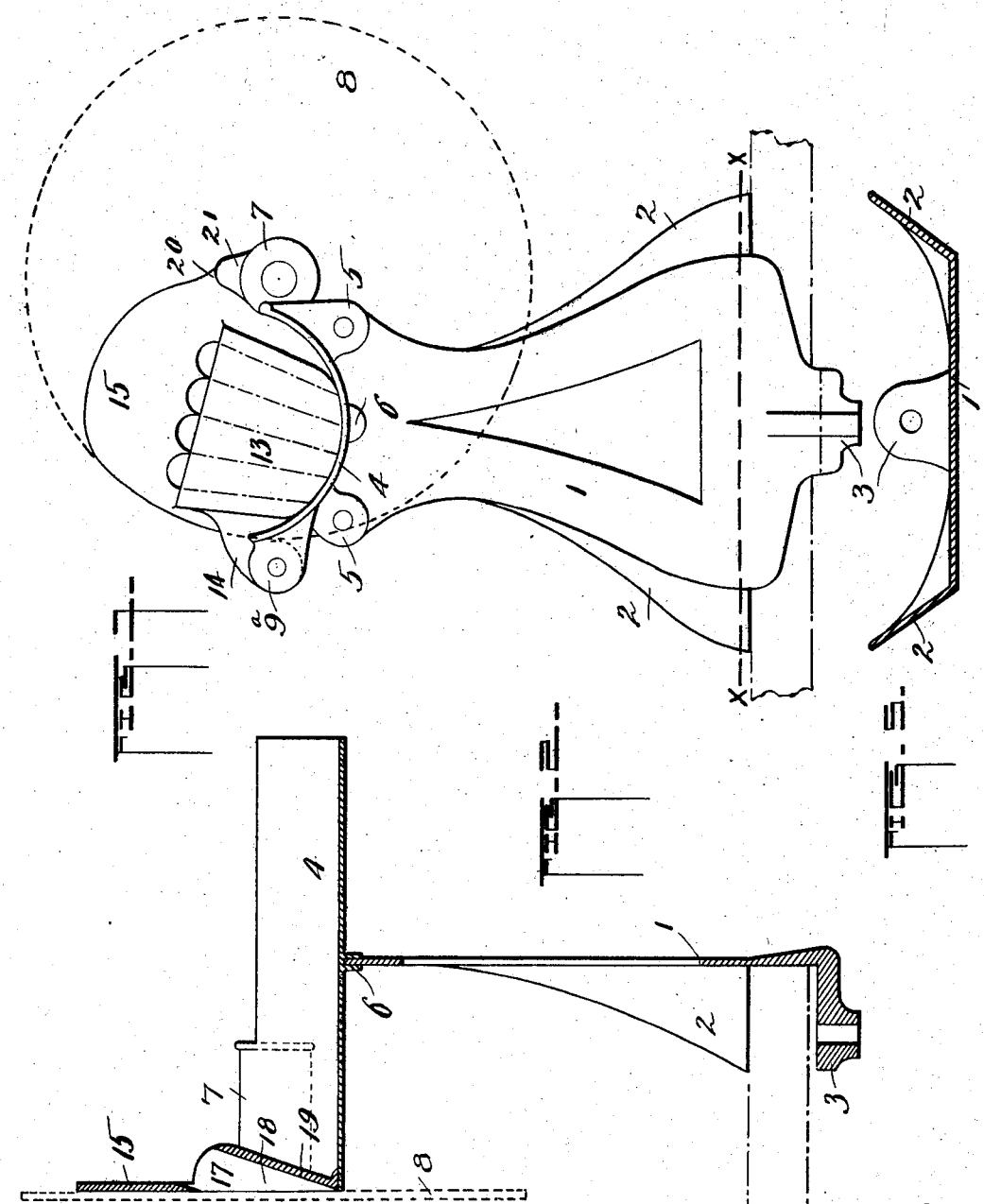

No. 739,270. Patented September 15, 1903.

UNITED STATES PATENT OFFICE.

WILLIAM F. WAGNER, OF PEORIA, ILLINOIS.

VEGETABLE OR MEAT CUTTER.

SPECIFICATION forming part of Letters Patent No. 739,270, dated September 15, 1903.

Application filed September 27, 1901. Serial No. 76,760. (No model.)

*To all whom it may concern:*

Be it known that I, WILLIAM F. WAGNER, a citizen of the United States, residing at Peoria, in the county of Peoria and State of Illinois, have invented certain new and useful Improvements in Vegetable or Meat Cutters; and I do hereby declare that the following is a full, clear, and exact description of the invention, which will enable others skilled in the art to which it appertains to make and use the same.

My invention relates to certain new and useful improvements in cutters, and especially to that class known as "vegetable and meat cutters," wherein a device is constructed being well adapted for the purpose designed and cheap at first cost.

More particularly my invention has reference to a vegetable-cutter provided with a knife and a pusher and combined therewith a sectional feeder having a swinging connection with the frame parts to facilitate the slicing of beans.

My invention consists, essentially, of a standard or suitable frame-support having connected therewith a table or trough of suitable construction which is arranged to carry a suitable cutter, of a feeder having a swinging relation in connection with the table or trough carried at the forward end thereof and arranged to be in close proximity to the cutter when swung into working position, of a shield attached to the feeder for the protection of the hand and a series of pockets with open faces adjacent to the cutter, and of details of construction hereinafter more fully described in the accompanying drawings, forming a part of this specification, in which—

Figure 1 is an elevation of a cutter, showing my improvements. Fig. 2 is a vertical longitudinal section of the same. Fig. 3 is a plan view. Fig. 4 is a vertical cross-section illustrating the swinging feeder, and Fig. 5 is a cross-section of the frame on the line X X.

Like numerals of reference indicate corresponding parts in the figures.

1 indicates a suitable standard or frame-support having the flared portion 2 and the lower angle-frame part 3, suitably arranged to adapt the standard or frame-support to be fixed to a table or other support.

4 refers to a table or trough semicircular in shape, with its convex side arranged to be attached to the standard 1 by means of the lips 5, to which the standard is secured, and the cleat 6 in the center portion of the trough, as shown.

7 is a tubular bearing forming a part of the trough, in which is arranged to be journaled (or pivoted, if so desired) a cutter, (indicated and outlined by dotted lines 8.) On the opposite side of the trough and at opposite ends thereof are shown suitable ears 9 and $9^a$, in which is secured a rod or spindle 10, extending the length of the trough, and intermediate the two ears 9 and $9^a$ and near to the front end of the trough is arranged a similar ear 11, and it is in between the ears 9 and 11 that I connect the swinging feeder to the spindle or rod 10, and between the ears $9^a$ and 11 is arranged to slide a pusher 12, which is illustrated in dotted lines in Fig. 3. The pusher is designed for shoving material to the cutter when the swinging feeder is out of the way; but of course it is designed not to be used when slicing beans. However, if desirable, the swinging feeder provided with a fluted face may be one with and form a part of the pusher, and it would perform the same function as it now does in two separate parts.

13 is a member of my device which is referred to as the "swinging feeder." The lower face of the same is of suitable contour to adapt it to fit snugly in the trough 4 when swung into position and is provided with the ear 14, having bearing on the spindle or rod 10, and 15 is a guard-plate extending up from the body of the feeder and lies adjacent to the cutter when in position for the protection of the hand and fingers when feeding beans to the feeder. The front face of the feeder is shown fluted, providing the grooves or pockets 17, of which there is a series, separated by the thin partitions 18, forming a part of the body, and the grooves or pockets 17 have the rounded back portion 19. These pockets or grooves are tapered, as shown, and converge from the top to the bottom of the main body 13, and the arrangement of the feeder itself to the trough is obliquely to the central bearing-line of the support for the trough. This arrangement will permit of a draw cut of the cutter or cutters as the same engage the beans as they are fed to the feeder.

20 is an ear arranged on the feeder to be dropped in between the lips 21 on the bearing 7 when in working position to insure the same being held to its work.

I have not paid any attention to the detail construction of the cutter or pusher, as I do not wish to confine myself to a rotary, reciprocating, or swinging cutter nor to any particular form of pusher, as I am aware that it will work with one as well as another, and also I do not wish to be limited to the exact construction and application of the feeder, as various changes may be made and details resorted to without affecting the principle of invention herein.

Having thus fully described my invention, what I claim, and desire to secure by Letters Patent of the United States, is—

1. The combination with a vegetable-cutter comprising a frame-support arranged with a trough and a suitable cutter, of a swinging feeder provided with a fluted face, all arranged substantially as described.

2. The combination with a feeder for vegetable-cutters, comprising a member having a swinging connection with the frame, of a series of converging grooves or pockets in the member and a guard-plate, substantially for the purpose described.

3. In a vegetable-cutter, the combination of a support, a trough arranged on the support and arranged to carry a suitable cutter, a feeder having a swinging connection with the trough and provided with a series of converging grooves or pockets arranged in a vertical line extending obliquely to the central bearing-line of the support, a guard-plate from the feeder and means of locking it from lateral movement, substantially as described.

In testimony whereof I affix my signature in presence of two witnesses.

WILLIAM F. WAGNER.

Witnesses:
CHAS. W. LA PORTE,
ROBERT N. MCCORMICK.